Oct. 15, 1935.  H. R. MINOR  2,017,071
METHOD OF SECURING ADHESION OF RUBBER TO METAL
Filed March 10, 1934
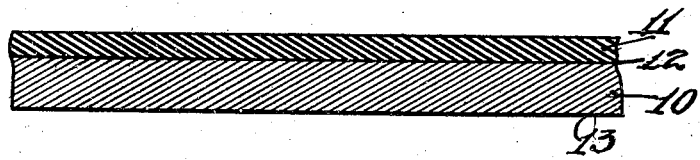
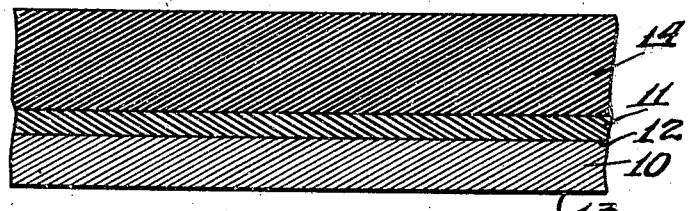
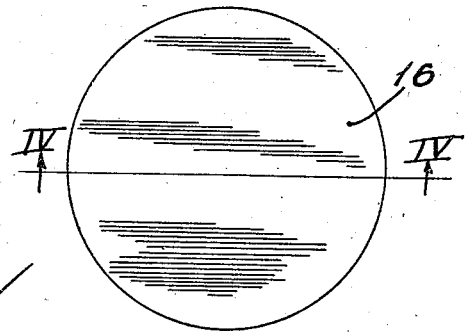
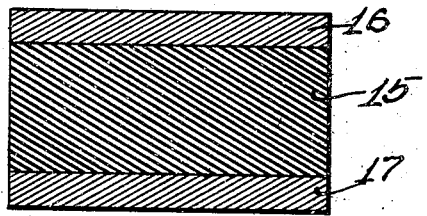

Patented Oct. 15, 1935

2,017,071

UNITED STATES PATENT OFFICE 2,017,071

METHOD OF SECURING ADHESION OF RUBBER TO METAL

Henry R. Minor, Oak Park, Ill., assignor, by mesne assignments, to Industrial Process Corporation, Saratoga Springs, N. Y., a corporation of New York Application March 10, 1934, Serial No. 714,920

23 Claims. (Cl. 18—59)

This invention relates to a method of securing adhesion between rubber and metal and more particularly between a relatively soft grade of rubber and ferrous metal.

Numerous methods have heretofore been devised for securing adhesion between rubber and metal. It is old, for instance, to vulcanize hard grades of rubber directly to both ferrous and non-ferrous metal. In the case of soft grades of rubber, however, direct vulcanization has proved unsatisfactory. Although much better results have been obtained, when using soft rubber, by the employment of cement prepared from rubber isomers, even this method has its drawbacks. Other expedients have included the use of brass plating over ferrous metals to aid in the adhesion between the rubber and metal surfaces.

I have now discovered that relatively soft grades of rubber may be bonded directly to ferrous metals and their alloys in a simple and economical manner and adhesions secured that are as good and better than those obtained by the use of cement. The simplicity and adaptability of my method for numerous uses makes it possible to manufacture many articles combining rubber and metal which have not heretofore been capable of successful accomplishment. In particular, my method has considerable value in connection with the cushioning of members subjected to shock and capable of relative movement, as in engines and other parts in automotive vehicles.

As contrasted with the adhesion secured by other methods, the adhesion between rubber and metal obtained according to my method is capable of withstanding severer flexing stresses at higher temperatures. Furthermore, the rubber, after union with the metal, exhibits a set that is well within the usual tolerances. By this is meant that the rubber does not assume an excessive permanent set when subjected to compression but, after the compressing force is released, returns to substantially its original thickness.

It is therefore an object of this invention to provide a method of securing good adhesion between rubber and metal and particularly between the softer grades of rubber and ferrous metals and their alloys.

It is a further important object of this invention to provide a relatively simple and economical method of making composite articles and the like by the adhesion of rubber to metal without the necessity of employing a contact layer of hard rubber or special rubber cement.

It is a further important object of this invention to provide a method of securing a high degree of adhesion between rubber and metal that will withstand severe flexing stresses and that will have excellent tensile strength, good resistance to high temperatures and a high degree of permanency.

It is a further important object of this invention to provide a method of bonding relatively soft rubber to ferrous metal and ferrous alloys that includes a simultaneous vulcanizing of the rubber compound to produce a soft vulcanized rubber of satisfactory physical qualities, including that of possessing a relatively low minimum set.

Other and further important objects of this invention will become apparent from the disclosures in the specification and the accompanying drawing.

This invention (in a preferred form) is illustrated in the drawing and hereinafter more fully described.

On the drawing:

Figure 1 is a fragmentary sectional view of a composite sheet or plate, illustrating an embodiment of this invention in the bonding of sheet rubber to a metal plate.

Figure 2 is a fragmentary sectional view of the composite sheet or plate of Fig. 1, with an additional layer of rubber vulcanized thereto.

Figure 3 is a top plan view of a composite disk of metal and rubber, and

Figure 4 is a sectional view taken substantially on the line IV—IV of Fig. 3.

As shown on the drawing:

The reference numeral 10 indicates a sheet or plate of a ferrous metal or ferrous alloy having applied thereto a sheet 11 of a relatively soft grade of rubber. Although my invention is applicable to both ferrous and non-ferrous metals, the most important advantages, as now contemplated, result from the bonding of rubber directly to ferrous metals and their alloys without the use of special expedients, such as scoring or grooving the surface of the metal, or employing special rubber cement. However, results may be obtained with my process on brass plated metal that are superior to the results heretofore realized by the usual rubber adhesion processes.

Similarly, although my invention will be specifically described with respect to the bonding of relatively soft grades of rubber to metal, it will be understood that this is because the advantages of my invention are most completely realized in the use of the softer grades of rubber rather than the harder grades. Ordinary methods of vulcanizing hard rubber to metal are reasonably satisfactory but are not at all satisfactory for securing soft rubber to metal.

In accordance with my invention, the layer 11 of vulcanizable soft rubber compound may either be applied to the metal plate 10 without being pressed thereagainst with any considerable force, or the layers 10 and 11 may be held together in a mold or press under pressures customary in vulcanizing practices, or even higher pressures. Heat is then applied to the interface 12, or surface of contact between the metal plate 10 and the rubber layer 11, by heating the exposed surface 13 of the metal plate 10.

To accomplish this, steam or other heating medium may be applied directly to the surface 13 or indirectly thereto through contact with a heated metal wall. Where steam is used, the temperatures produced by steam pressures of 100 pounds per square inch and over, and preferably about 135 pounds per square inch, have proved very satisfactory for obtaining good adhesion between the rubber layer 11 and the metal plate 10. The heating time to be employed will, of course, depend in part upon the composition of the rubber layer 11 and also upon its thickness, longer time periods being used with greater thicknesses of the rubber layer 11. Steam pressures over 150 lbs. per sq. in. have been satisfactorily used, as have also heating times of less than one hour.

As a result of the use of these relatively high temperatures, which are notably higher than the usual vulcanizing temperatures, the rubber locally of the interface 12 is depolymerized to a considerable extent and its viscosity correspondingly lowered. By the term "depolymerization" is meant the phenomenon that occurs in the structure of the rubber molecule and believed to result in the shortening of the molecular chain. At the same time, the heating of the metal plate 10 causes it to expand and enlarges the pores of the surface of the metal in contact with the rubber layer 11. As a result, it is believed that the depolymerized and therefore less viscous rubber physically penetrates into the surface of the metal, even if only for microscopical distances, to secure true adhesion to the metal.

The time during which heat is applied to the metal plate 10 in order to secure good adhesion between the rubber layer 11 and the metal plate 10 will vary in accordance with the temperature used and also with the thickness of the rubber sheath 11. With a steam pressure of about 135 lbs. per sq. in. and a rubber sheath or layer of from 1 to $\frac{1}{16}$ths of an inch in thickness, the time may be as short as one hour or even somewhat shorter. With lower steam pressures and thicker rubber layers, the time may have to be increased to a matter of several hours.

The conditions to be employed for securing good adhesion between the rubber and metal, and the results obtained, will obviously depend considerably upon the composition of the rubber compound used in preparing the layer 11. The following will serve to illustrate various typical formulae for the rubber compound:

Formula No. 1

| | Parts by wt. |
|---|---|
| Smoked sheet | 100 |
| Methylene p-toluidine | 2.6 |
| Sulfur | 6.5 |
| Zinc oxide | 5 |
| Aldol-alpha naphthylamine | 1.75 |
| Soft carbon | 30 |
| Lime | 4 |

Formula No. 2

| | |
|---|---|
| Smoked sheet | 50 |
| Rolled brown | 50 |
| Methylene p-toluidine | 2.6 |
| Sulfur | 6.5 |
| Zinc oxide | 35 |
| China clay | 28.5 |
| Aldol-alpha naphthylamine | 1.75 |
| Lime | 1.5 |

Formula No. 3

| | |
|---|---|
| Smoked sheet | 100 |
| Methylene p-toluidine | 2.6 |
| Sulfur | 6.5 |
| Zinc oxide | 5 |
| Aldol-alpha naphthylamine | 1.75 |
| Carbon black | 45 |
| Lime | 4 |

Formula No. 4

| | |
|---|---|
| Smoked sheet | 100 |
| Methylene p-toluidine | 2.6 |
| Sulfur | 6.5 |
| Zinc oxide | 5 |
| Aldol-alpha naphthylamine | 1.75 |
| Soft carbon | 45 |
| Lime | 4 |

The following table will indicate the results obtained by the use of the foregoing formulæ, showing the hardness of the rubber compound as obtained on a Stickney durometer, the step expressed in percentages and the quality of the adhesion:

| Formula | Hardness (Stickney durometer) | Set | Adhesion |
|---|---|---|---|
| | | Percent | |
| 1 | 40 | 10 | Excellent. |
| 2 | 40 | 12 | Do. |
| 3 | 58 | 8.2 | Do. |
| 4 | 40 | 12.8 | Do. |

As will be observed, a relatively low minimum set and excellent adhesion may be secured by my method with rubber compositions varying in hardness over a considerable range. In fact, there is no difficulty in securing excellent adhesion between the rubber and metal whether the rubber stock be soft, such as indicated by a hardness of 30 to 40 units, or whether it has a hardness of between 50 and 60 units. In the past, it has been practically impossible by the use of other methods to secure satisfactory adhesion with a hardness of 60.

The method by which the percentage of set is obtained is as follows. The sample of rubber to be tested should be a disc 1⅛" in diameter and ½ inch thick. The tester used has a pressure foot ⅞" in diameter, by means of which a spring load of 400 lbs. is applied to the surface of the rubber disc over a period of 22 hours and at 70° C. After the load has been removed, the rubber is allowed to stand for 1 hour and at the end of that period, its reduction in thickness is measured. The set is expressed as the percentage of reduction on the basis of the original thickness of the rubber.

In practice, the permissible set will vary depending upon the degree of softness of the rubber, one automotive manufacturer specifying not more than 15% set on a 30 hardness of rubber and not more than 10% set on a 40 to 60 hardness of rubber. As indicated in the above table, the set of rubber bonded to metal in accordance with my invention is in general within these permissive ranges. My invention is, of course, not limited to the use of rubber stock having the specific formulæ given above, since, in general, any vulcanizable rubber stock capable of producing a soft rubber upon vulcanization can be employed. By the term "soft rubber" is meant a rubber having a durometer test between about 20 and 80 units on a Stickney durometer. There are, however, certain points to be observed in compounding the rubber stock for use in carrying out my invention if satisfactory results are to be obtained.

In the first place, it is preferable to use an amount of sulfur somewhat in excess of that ordinarily used for vulcanizing purposes if excellent adhesion is to be obtained. This excess of sulfur, however, does not show up in the vulcanized rubber as free sulfur but appears to be more efficiently combined with the rubber than would be the case if the rubber stock were subjected merely to the ordinary vulcanizing temperatures and pressures. This phenomenon can possibly be explained by reference to the higher temperatures that are employed in my process. It is my theory that the high temperature to which the metal plate 10 is heated causes the sulfur to be driven away from the interface 12 because of the fact that the sulfur in the rubber locally of the interface 12 will become heated to substantially the temperature of the metal plate 10 and a relatively high sulfur vapor pressure thereby built up, with the result that there will be a flow of sulfur or sulfur vapor toward the inner parts of the rubber layer 11.

As a consequence of this temporary driving away of the sulfur from the interface 12, the rubber adjacent the interface 12 is quickly depolymerized upon the application of heat through the metal plate 10 and depolymerization proceeds to the necessary extent to provide good adhesion between the rubber and metal before vulcanization of the rubber to any substantial extent can occur. Later on, as the heating is continued, the vulcanization of the body of the rubber in the layer 11 away from the interface is completed, the entire mass of the rubber in the layer 11 is brought to substantially the same temperature throughout, and the vapor pressure of the sulfur becomes substantially equalized at all points in the layer 11. Consequently, even the rubber adjacent the interface 12 is ultimately vulcanized to substantially the same degree of vulcanization as the rubber in other parts of the layer 11. It is probable that owing to the higher temperatures used in my process than those customary in vulcanizing processes, the sulfur is taken up more completely by the rubber and more sulfur is consumed than in the ordinary vulcanizing practices. In any event, after the heating operation is complete, substantially no uncombined sulfur can be found in the rubber layer.

Another interesting fact with regard to my process is that much better adhesion can be obtained if a mild accelerator is used instead of a more quickly acting accelerator. The accelerator that I have found most satisfactory is methylene para-toluidine, which is notably a mild accelerator. Other slow acting accelerators, such as litharge, calcined magnesium oxide, lime and mercapto benzo thiazol without an activator, may be used. When mercapto benzo thiazol, commonly known by the trade name "Captax", is used in conjunction with an activator, such as stearic acid, very unsatisfactory results are obtained from my process, owing apparently to the fact that the vulcanizing action is speeded up to such an extent that the rubber adjacent the interface 12 becomes vulcanized so rapidly that it interferes with the depolymerizing action of the heat applied to the metal layer 10.

When my process is carried out using a rubber stock such as indicated by any of the above formulæ, I have been able to obtain an adhesion between the rubber layer 11 and an iron or steel plate 10 that is better than the adhesion possible according to heretofore known methods of first brass plating the metal and then applying the rubber. Expressed in terms of tensile strength, my process results in a bond between the rubber and metal that requires upwards of 400 lbs. per sq. in. and over to disrupt, and usually the disruption occurs in the body of the rubber layer itself rather than at the interface 12.

Although, as previously indicated, it is possible to bond relatively thick layers of rubber to metal, it is sometimes preferable to apply first a comparatively thin layer, such as the layer 11, to the metal and then vulcanize onto the rubber layer 11 a layer 14 of any desired thickness. The vulcanization of the layer 14 (Fig. 2) to the layer 11 is carried out in the usual way.

Instead of bonding the rubber on one surface only to metal, as shown in Figs. 1 and 2, I also contemplate building up a laminated structure in accordance with my method by bonding an intermediate layer of rubber 15 to external metal plates 16 and 17 (Figs. 3 and 4). This can be suitably accomplished by positioning the superimposed layers 17, 15 and 16 in a press, mold, die or the like, and applying the heat and pressure through the containing walls that are in contact with the metal plates 16 and 17. Where a press is used in the manner indicated, it is found that higher pressure, in the neighborhood of several hundred pounds per square inch and over, tend to give better adhesion than where only slight pressures are used. Also, there is some advantage in using a substantially air tight press or mold, since under those circumstances air is largely excluded from the rubber during the heating operation and oxidation thereof thereby prevented.

As will be apparent from the foregoing description, some of the important features of my invention are that good adhesion is obtained between the rubber and metal without resorting to such expedients as brass plating the metal, scoring or grooving it, or first applying cement thereto. The scope of my invention, however, does not preclude the possibility of using these aids where desired.

My process is not to be confused with processes heretofore suggested in which a bond between metal and rubber has been alleged to have been secured by heating the metal above the melting point of rubber and bringing the hot metal into contact with vulcanized rubber, as by inserting a metal shaft into a shell of vulcanized rubber. In my process, vulcanizable stock is used and the vulcanization is carried out simultaneously with the obtaining of the adhesion between the rubber and metal by a continued application of heat through the metal itself. It is not possible to obtain satisfactory adhesion starting with a vulcanized rubber stock in accordance with the previously known method just described. According to my method, the structural changes necessary to effect good adhesion between the rubber and metal must be allowed to take place before the mass of the rubber is vulcanized.

This application is a continuation in part of my application Serial No. 661,773, filed March 20, 1933.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. The method of securing adhesion between rubber and metal, which comprises bringing unvulcanized rubber and metal into good surface contact with each other, subjecting the metal to a temperature above the usual vulcanizing temperatures and sufficient to depolymerize the rubber locally of the metal surface before any substantial vulcanization of the rubber locally of the metal surface can occur and continuing the application of heat through the metal until satisfactory adhesion between the rubber and metal will be secured upon cooling.

2. The method of securing adhesion between rubber and metal, which comprises superimposing a vulcanizable soft rubber compound on a metal surface, applying sufficient heat through the metal surface to reduce the viscosity of the rubber compound locally thereof and effect a bond therebetween before substantial vulcanization of the rubber locally of said surface can occur and continuing the application of heat until satisfactory adhesion between the rubber and metal will be secured upon cooling.

3. The method of bonding rubber directly to ferrous metal, which comprises applying sufficient heat through a layer of ferrous metal in direct contact with vulcanizable rubber stock to raise the temperature at the metal-rubber interface above normal vulcanizing temperatures and continuing the application of heat thereto until satisfactory adhesion between the rubber and metal will be obtained upon cooling down to normal temperature.

4. The method of bonding soft rubber directly to ferrous metal, which comprises applying sufficient heat through a layer of ferrous metal in direct contact with vulcanizable rubber stock containing a mild accelerator to raise the temperature at the metal-rubber interface above normal vulcanizing temperatures and cause depolymerization of the rubber locally of said interface and continuing the application of heat thereto until satisfactory adhesion between the rubber and metal will be obtained upon cooling down to normal temperature.

5. The method of bonding rubber to metal, which comprises preparing a layer of vulcanizable soft rubber stock containing a mild accelerator, pressing together said layer of rubber stock and a layer of metal, applying sufficient heat to the metal-rubber interface to raise the temperature of the rubber locally of said interface considerably above normal vulcanization temperatures and effect depolymerization thereof and continuing the application of heat until vulcanization of the rubber layer is complete.

6. The method of bonding rubber to metal, which comprises preparing a layer of vulcanizable soft rubber stock containing methylene p-toluidine, pressing together said layer of rubber stock and a layer of metal, rapidly applying sufficient heat to the metal-rubber interface to raise the temperature of the rubber locally of said interface considerably above normal vulcanization temperatures and effect depolymerization thereof before vulcanization of the rubber at the interface can occur and continuing the application of heat until vulcanization of the rubber layer is complete.

7. The method of bonding rubber to metal, which comprises forming a layer of vulcanizable soft rubber stock containing an excess of sulphur over that normal for vulcanization and a slow acting accelerator, arranging said rubber stock layer in contact with a layer of ferrous metal, applying sufficient heat to said metal layer to heat the rubber stock adjacent said metal layer above the normal vulcanizing temperatures to depolymerize the said rubber stock locally of the metal before any substantial vulcanization can take place, continuing the application of heat until vulcanization of the entire rubber stock layer is substantially complete.

8. The method of bonding rubber to metal, which comprises pressing a layer of vulcanizable soft rubber stock against a layer of ferrous metal, applying steam of at least 100 lbs. per sq. in. pressure to said metal layer to rapidly raise the temperature of the rubber adjacent the metal surface and cause the rubber to depolymerize before vulcanization sets in and continuing the application of heat until good adhesion between the rubber and metal will be obtained upon cooling.

9. The method of bonding rubber to metal, which comprises pressing a layer of vulcanizable soft rubber stock containing a mild accelerator directly against a layer of ferrous metal, applying steam of at least 100 lbs. per sq. in. pressure to said metal layer to rapidly raise the temperature of the rubber adjacent the metal surface and cause the rubber to depolymerize before vulcanization sets in and continuing the application of heat until good adhesion between the rubber and metal will be obtained upon cooling and until substantially complete vulcanization of the rubber stock has been obtained.

10. The method of bonding rubber to metal, which comprises pressing a layer of vulcanizable soft rubber stock containing a mild accelerator directly against a layer of ferrous metal, applying steam of about 135 lbs. per sq. in. pressure to said metal layer to rapidly raise the temperature of the rubber adjacent the metal surface and cause the rubber to depolymerize before vulcanization sets in and continuing the application of heat for at least one hour until good adhesion between the rubber and metal will be obtained upon cooling and until substantially complete vulcanization of the rubber stock has been obtained.

11. The method of bonding rubber to metal, which comprises pressing metal plates against opposite sides of a layer of vulcanizable soft rubber, applying heat rapidly through said metal plates to raise the temperature of the rubber adjacent the faces of said metal plates substantially above normal vulcanizing temperatures, thereby causing physical adhesion of the rubber to the metal, and continuing the application of heat until vulcanization is substantially complete.

12. The method of bonding rubber to metal, which comprises pressing metal plates against opposite sides of a layer of vulcanizable soft rubber containing a slow acting accelerator, applying heat rapidly through said metal plates to raise the temperature of the rubber adjacent the faces of said metal plates substantially above normal vulcanizing temperatures, thereby causing physical adhesion of the rubber to the metal, and continuing the application of heat until vulcanization is substantially complete.

13. The method of bonding rubber to metal, which comprises pressing metal plates against opposite sides of a layer of vulcanizable soft rubber, applying heat by means of steam at above 100 lbs. per sq. in. rapidly through said metal plates to raise the temperature of the rubber adjacent the faces of said metal plates substantially above normal vulcanizing temperatures, thereby causing physical adhesion of the rubber to the metal, and continuing the application of heat until vulcanization is substantially complete.

14. A composite article comprising a layer of ferrous metal and a soft rubber bonded directly thereto and inseparable therefrom by a force less than 400 lbs. per sq. in.

15. A composite article comprising a layer of ferrous metal and a soft rubber bonded directly thereto and inseparable therefrom by a force less than 400 lbs. per sq. in., said rubber having a minimum set of less than 15% and a durometer hardness between 30 and 60 units after being vulcanized.

16. The method of attaching rubber to metal comprising applying a slab of unvulcanized rubber to a surface thereof, and subjecting the metal to a temperature in excess of that required for vulcanization and for a sufficiently long period to secure intimate bonding of the rubber with the metal while leaving the body of the rubber unexposed to the high temperature.

17. The method of attaching rubber to metal comprising applying to the metal a slab of unvulcanized rubber so that the heat will flow freely therethrough, and subjecting the surface of the rubber in contact with the metal to a temperature in excess of vulcanizing temperature and for a sufficiently extended period to secure intimate bonding of the rubber with the metal while the metal is expanded.

18. The method of attaching rubber to metal comprising applying to the metal a slab of unvulcanized rubber so that the heat will flow freely therethrough, subjecting the surface of the rubber in contact with the metal to a temperature in excess of vulcanizing temperature and for a sufficiently extended period to secure intimate bonding of the rubber with the metal while the metal is expanded, and during the process maintaining the rubber remote from the surface in contact with the metal below vulcanizing temperature.

19. The method of bonding rubber to metal comprising applying to a surface of the metal a slab of unvulcanized rubber containing sulphur and of sufficient thickness to permit the dissipation of heat through the rubber, maintaining the outer surface of the rubber at a temperature below vulcanization and raising and maintaining the temperature at the interfacial surface of the rubber and metal above the temperature of vulcanization and thereby securing depolymerization of the rubber at the union while driving the sulphur away from the metal surface.

20. The method of bonding rubber to metal comprising applying to a surface of the metal a slab of unvulcanized rubber containing sulphur and of sufficient thickness to permit the dissipation of heat through the rubber, maintaining the main body of the rubber at a temperature below vulcanization, raising and maintaining the temperature at the interfacial surface of the rubber and metal above the temperature of vulcanization and thereby securing depolymerization of the rubber at the union while driving the sulphur away from the metal surface, and uniting the slab of rubber to a second body of rubber.

21. The method of bonding unvulcanized rubber to metal comprising subjecting the rubber in contact with the metal to temperatures in excess of vulcanizing temperatures so that the surface of the rubber while in contact with the metal is depolymerized.

22. The method of bonding a layer of unvulcanized rubber to metal comprising subjecting the rubber in contact with the metal to temperatures in excess of vulcanizing temperatures so that the surface of the rubber while in contact with the metal is depolymerized.

23. The method of bonding a layer of unvulcanized rubber to metal comprising subjecting the rubber in contact with the metal to temperatures in excess of vulcanizing temperatures so that the surface of the rubber while in contact with the metal is depolymerized, and thereafter vulcanizing a body of rubber thereto.

HENRY R. MINOR.